US012755056B2

(12) United States Patent
Chiba et al.

(10) Patent No.: US 12,755,056 B2
(45) Date of Patent: Oct. 6, 2026

(54) DETECTION DEVICE, DETECTION METHOD, AND DETECTION PROGRAM

(71) Applicant: NTT, Inc., Tokyo (JP)

(72) Inventors: Nobuhiro Chiba, Tokyo (JP); Hiroyoshi Takiguchi, Tokyo (JP); Takaaki Koyama, Tokyo (JP); Yoshiaki Nakajima, Tokyo (JP)

(73) Assignee: NTT, Inc., Tokyo (JP)

( * ) Notice: Subject to any disclaimer, the term of this patent is extended or adjusted under 35 U.S.C. 154(b) by 102 days.

(21) Appl. No.: 18/727,008

(22) PCT Filed: Jan. 11, 2022

(86) PCT No.: PCT/JP2022/000592
§ 371 (c)(1),
(2) Date: Jul. 5, 2024

(87) PCT Pub. No.: WO2023/135653
PCT Pub. Date: Jul. 20, 2023

(65) Prior Publication Data
US 2025/0094643 A1 Mar. 20, 2025

(51) Int. Cl.
*G06F 21/64* (2013.01)

(52) U.S. Cl.
CPC .................................... *G06F 21/64* (2013.01)

(58) Field of Classification Search
CPC .......... G06F 21/64; G06F 21/57; G06F 21/62; G06F 21/6209; G06F 21/6227
See application file for complete search history.

(56) References Cited

U.S. PATENT DOCUMENTS

| | | | | |
|---|---|---|---|---|
| 6,021,510 | A | 2/2000 | Nachenberg | |
| 2006/0259781 | A1* | 11/2006 | Saeki | G06F 21/64 713/189 |
| 2007/0033235 | A1 | 2/2007 | Kato et al. | |
| 2018/0341666 | A1* | 11/2018 | Lee | G06F 11/1464 |
| 2022/0269803 | A1* | 8/2022 | Kura | G06F 21/565 |

FOREIGN PATENT DOCUMENTS

| | | | |
|---|---|---|---|
| JP | 2016081154 | A | 5/2016 |
| JP | 2019008376 | A | 1/2019 |
| WO | 2005/111809 | A1 | 11/2005 |

OTHER PUBLICATIONS

Daisuke Onuki (2002) "Start Linux security from scratch (8): Building a hosted IDS with Tripwire" ITmedia Inc. [online] Accessed on Jan. 5, 2022, website: https://atmarkit.itmedia.co.jp/ait/articles/0203/19/news002_2.html.

* cited by examiner

*Primary Examiner* — Malcolm Cribbs

(57) ABSTRACT

A detection device includes processing circuitry configured to acquire position information and a file size of a falsification detection target file, and determine a change in the position information or the file size acquired, and detect falsification of the falsification detection target file in a case where there is a change in the position information or the file size.

12 Claims, 9 Drawing Sheets

Fig. 2

| FILE PATH | DIGEST VALUE OF FILE CONTENT | POSITION INFORMATION OF FILE (Block NUMBER OR LIKE OF ext2) | DIGEST VALUE OF POSITION INFORMATION OF FILE | ATTRIBUTE INFORMATION OF FILE (SIZE OR LIKE) |
|---|---|---|---|---|
| /home/ntt/test.txt | a84bf2cd220be241 | 34,35,36,58 | dd79e4bcad1823cc | 15,343 |
| /usr/local/test.bin | 341566fa47773c80 | 78,79,80,81,82,103··· | af4e0edbe357672e | 5,633,789 |
| ⋮ | | | | |

Fig. 3

| | | | | FILE ATTRIBUTE INFORMATION | |
|---|---|---|---|---|---|
| TYPE OF FILE CONTENT FALSIFICATION | FILE PATH | DIGEST VALUE OF FILE CONTENT | POSITION INFORMATION (Block NUMBER OR LIKE) | i-node NUMBER | FILE SIZE |
| OVERWRITE UPDATE (NO RESIZING. echo COMMAND) | – | ○ (CHANGED) | ○ (CHANGED) | × | × |
| ADDITIONAL NOTE (WITH RESIZING. echo COMMAND) | – | ○ (CHANGED) | × ~ ○ (NO CHANGE TO CHANGE) | × | ○ (CHANGED) |
| FILE REPLACEMENT (DELETE + NEW CREATION) | – | ○ (CHANGED) | ○ (CHANGED) | ○ (CHANGED) | × ~ ○ (IF SIZE CHANGES) |

Fig. 5

| ACQUISITION TARGET | NUMBER OF TARGETS | ACQUISITION TIME [s] | AVERAGE ACQUISITION TIME PER FILE [ms] |
| --- | --- | --- | --- |
| DIGEST VALUE OF FILE CONTENT | 68,271 | 187.8 | 2.75 |
| POSITION INFORMATION AND ATTRIBUTE INFORMATION OF FILE (Block NUMBER, SIZE, OR LIKE) | 68,271 | 20.2 | 0.30 |

Fig. 6

NOT REQUIRED IF BLOCK NUMBER Hash VALUE IS AVAILABLE

| FILE NAME | DIGEST VALUE OF FILE CONTENT | POSITION INFORMATION (BLOCK NUMBER OR LIKE) | DIGEST VALUE OF POSITION INFORMATION | FILE ATTRIBUTE INFORMATION (SIZE OR LIKE) |
|---|---|---|---|---|
| a.txt | 4ea9cd0eb21aa | 1,2,5 | 18h3e5ba8c944 | 13,343 |
| b.mp4 | 834a7e9cbe12a | 3,4,6,7,8,··· | 9beed8aa74cf2 | 654,856 |
| c.bin | fe8dc7b1a6e27f | 10,14,17,18,19,30··· | 2e887d7c6a11c | 4,485,357 |
| | | | | |

CONVENTIONAL DETERMINATION CRITERION

DETECTION DEVICE, DETECTION METHOD, AND DETECTION PROGRAM

CROSS-REFERENCE TO RELATED APPLICATIONS

This application is a U.S. 371 Application of International Patent Application No. PCT/JP2022/000592, filed on 11 Jan. 2022, the disclosure of which is hereby incorporated herein by reference in its entirety.

TECHNICAL FIELD

The present invention relates to a detection device, a detection method, and a detection program.

BACKGROUND ART

Conventionally, as a method for detecting falsification, a method using a digest value of file contents is known. For example, there is a mechanism in which, in a case where the presence or absence of falsification of the content of a file in a device is checked, a list indicating a combination of each file path in the device and a digest value of the file content is defined as a determination criterion in advance, and thereafter, when the presence or absence of falsification in the device is checked, the determination criterion is sequentially compared with the digest value of the file content in the device, and the presence or absence of falsification is checked based on the presence or absence of a difference therebetween.

In addition, as a method for detecting falsification, a method using attribute information of a file is also known in addition to a file content. For example, there is software for detecting falsification of a file on the basis of a change in the attribute information of the file.

CITATION LIST

Patent Literature

Patent Literature 1: Japanese Laid-open Patent Publication No. 2019-008376 A

Non Patent Literature

Non Patent Literature 1: Zero kara hajimeru Linux sekyuriti (8) Tripwire ni yoru hosuto-gata IDS no kochiku, (in Japanese) (Start Linux security from scratch (8) Building a hosted IDS with Tripwire), [online], [retrieved on Jan. 5, 2022], the Internet <atmarkit.itmedia.co.jp/ait/articles/0203/19/news002_2.html>

SUMMARY OF INVENTION

Technical Problem

However, the conventional technique has a problem that falsification of a file cannot be accurately and quickly detected in some cases. For example, in the conventional method using the digest value of the file content, it is necessary to read the entire file content once in order to generate the digest value of the file content in the device when confirming the presence or absence of falsification, and in a case where there is a large file or a large number of files in the device, it takes time to read the entire file content, and it is not possible to quickly notice the falsification of the device.

In addition, in the conventional method using the attribute information of the file, there is a pattern (a pattern of rewriting contents while keeping the same file size, a pattern of falsifying a time stamp after a file content change to a time stamp before the change, and the like) in which the attribute information does not change even if the file content is falsified, and it is difficult to prevent such file falsification.

The present invention has been made in view of the above, and an object thereof is to provide a detection device, a detection method, and a detection program capable of accurately and quickly detecting falsification of a file.

Solution to Problem

In order to solve the above problems and achieve the object, a detection device includes processing circuitry configured to acquire position information and a file size of a falsification detection target file, and determine a change in the position information or the file size acquired, and detect falsification of the falsification detection target file in a case where there is a change in the position information or the file size.

Advantageous Effects of Invention

According to the present invention, it is possible to accurately and quickly detect falsification of a file.

BRIEF DESCRIPTION OF DRAWINGS

FIG. 2 is a diagram illustrating an example of a determination criterion saved in a determination criterion memory unit.

FIG. 3 is a diagram illustrating information used for falsification detection.

FIG. 5 is a diagram illustrating a comparison between a detection time of the detection device of the present embodiment and a conventional detection time.

FIG. 6 is a diagram illustrating another example of a determination criterion.

DESCRIPTION OF EMBODIMENTS

The following description will explain an embodiment of a detection device, a detection method, and a detection program according to the present application in detail with reference to the drawings. Moreover, the present invention is not limited to the embodiment described below.

[Configuration of Detection Device]

Figure 1:
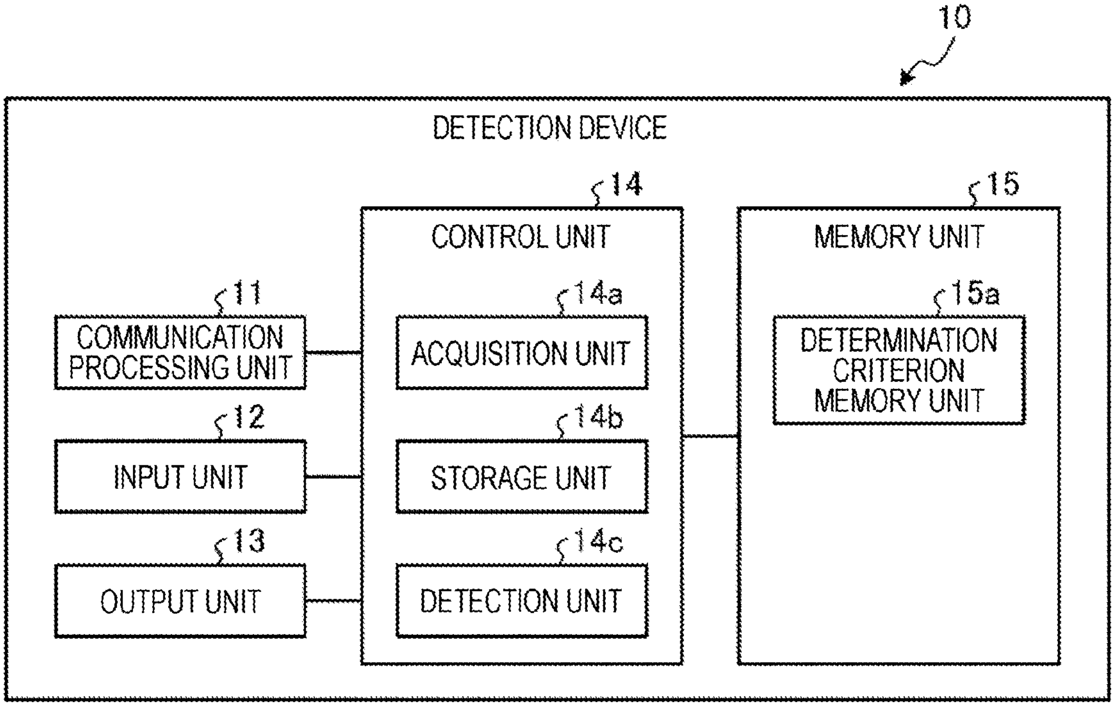
FIG. 1 is a block diagram illustrating a configuration of a detection device of a present embodiment.

FIG. 1 is a block diagram illustrating a configuration of the detection device of the present embodiment. As illustrated in FIG. 1, a detection device 10 of the present embodiment includes a communication processing unit 11, an input unit 12, an output unit 13, a control unit 14, and a memory unit 15.

The communication processing unit 11 is realized by a network interface card (NIC) or the like, and controls communication between a target device (not illustrated) saving a falsification detection target file and the control unit 14 via a telecommunication line such as a local area network (LAN) or the Internet. For example, the communication processing unit 11 receives a set of the file path, the digest value of the file content, the position information of the file, the digest value of the position information, and the attribute information of the file from the target device.

The input unit 12 is implemented by using an input device such as a keyboard or a mouse and inputs various types of instruction information such as processing start to the control unit 14 in response to an input operation by an operator. The output unit 13 is implemented by a display device such as a liquid crystal display. For example, the output unit 13 outputs a result of falsification detection.

The memory unit 15 saves data and programs necessary for various processing procedures by the control unit 14, and includes a determination criterion memory unit 15*a*. For example, the memory unit 15 is a semiconductor memory element such as a random access memory (RAM) or a flash memory, or a storage device such as a hard disk or an optical disc.

The determination criterion memory unit 15*a* stores a determination criterion created in advance for detecting falsification. For example, as illustrated in FIG. 2, the determination criterion memory unit 15*a* stores a file path, a digest value of file contents, file position information, a digest value of file position information, and file attribute information as determination criteria. FIG. 2 is a diagram illustrating an example of a determination criterion saved in a determination criterion memory unit.

The control unit 14 includes an internal memory for storing a program defining various processing procedures and the like and required data, and executes various types of processing using the program and the data. For example, the control unit 14 includes an acquisition unit 14*a*, a storage unit 14*b*, and a detection unit 14*c*. Here, the control unit 14 is an electronic circuit such as a central processing unit (CPU) or a micro processing unit (MPU), or an integrated circuit such as an application specific integrated circuit (ASIC) or a field programmable gate array (FPGA).

The acquisition unit 14*a* acquires position information and a file size of a falsification detection target file. The acquisition unit 14*a* may acquire the digest value of the file position information instead of the file position information, or may acquire the digest value of the file position information together with the file position information. For example, the acquisition unit 14*a* acquires a digest value of position information and a file size of a falsification detection target file.

For example, the acquisition unit 14*a* acquires the position information and the file size of the falsification detection target file when the determination criterion is generated and when the falsification detection is performed as the acquisition timing.

For example, when the determination criterion is generated, the acquisition unit 14*a* acquires a set of a file path, a digest value of a file content, file position information, a digest value of position information, and file attribute information of the file for a falsification detection target file with from the target device.

In addition, when falsification is detected, the acquisition unit 14*a* acquires the position information and the file size of the falsification detection target file from the target device. Note that the acquisition unit 14*a* may acquire a set of the file path, the digest value of the file content, the file position information, the digest value of the position information, and the attribute information of the file for the falsification detection target file from the target device when the falsification is detected.

The storage unit 14*b* generates a determination criterion including the position information or the file size acquired by the acquisition unit 14*a*, and stores the determination criterion in the determination criterion memory unit 15*a*. For example, the storage unit 14*b* generates a set of a file path, a digest value of a file content, file position information, a digest value of the position information, and file attribute information as a determination criterion, and stores the set in the determination criterion memory unit 15*a*.

Then, the detection unit 14*c* determines a change in the position information or file size acquired by the acquisition unit 14*a*, and in a case where there is a change in the position information or file size, detects falsification of the falsification detection target file. In addition, the detection unit 14*c* may determine a change in the digest value or the file size of the position information acquired by the acquisition unit 14*a*, and in a case where there is a change in the digest value or the file size of the position information, may detect falsification of the falsification detection target file.

For example, the detection unit 14*c* compares the position information and the file size included in the determination criterion saved in the determination criterion memory unit 15*a* with the position information and the file size acquired at the time of performing the falsification detection, and detects, in a case where any of the position information and the file size does not match, the falsification of the falsification detection target file assuming that there is a change in the position information or the file size.

Note that the detection unit 14*c* may further detect falsification using a digest value of the file content. For example, the detection unit 14*c* may further determine, in a case where there is a change in the position information or the file size, whether there is a change in a digest value of the file content, and in a case where there is a change in the digest value of the file content, detects falsification of a falsification detection target file. More specifically, for example, in a case of checking whether the file of the target device has been falsified, the detection unit 14*c* compares the file path within the determination criterion, the position information of the file (or the digest value of the position information), the attribute information of the file, and each piece of information in the device, and checks whether or not there is a mismatch. Then, if there is no mismatch, the detection unit 14*c* determines that the device is not falsified, and ends the confirmation. If there is a mismatch, the detection unit 14*c* compares the digest value of the file content within the determination criterion of the file path with the digest value of the file in the device, and determines, if there is a mismatch, that the content of the file is falsified.

Here, information used for falsification detection will be described with reference to FIG. 3. FIG. 3 is a diagram illustrating information used for falsification detection. As illustrated in FIG. 3, examples of the type of file content falsification include “overwrite update”, “additional note”, and “file replacement”. In the example of FIG. 3, in the case of the overwrite update, since the file attribute information (i-node number and file size) does not change, the detection unit 14*c* cannot detect the falsification of the file content only by the file attribute information, but can detect the falsification by the position information. Note that, in the case of the additional note and in the case of the additional note with a small size, the detection unit 14*c* cannot detect falsification based only on the position information because the position information does not change. However, the detection unit 14*c* can detect falsification by combining the file size of the file attribute information.

As described above, the detection unit 14*c* detects that the file content is falsified by combining the position information of the storage area of the file on the file system and the file size as a method of detecting file falsification. For example, in a file system such as ext2 of Linux (registered trademark), a storage area is managed in units of blocks, and corresponds to a data block number. In addition, in the case of a file system of Windows (registered trademark), it corresponds to a cluster number. The Block number indicates a position on the storage medium, and the entire file is read by following a plurality of block numbers associated with the file. That is, the Block number is an address on the storage, and it is difficult for the user to easily change the block number.

Figure 4:
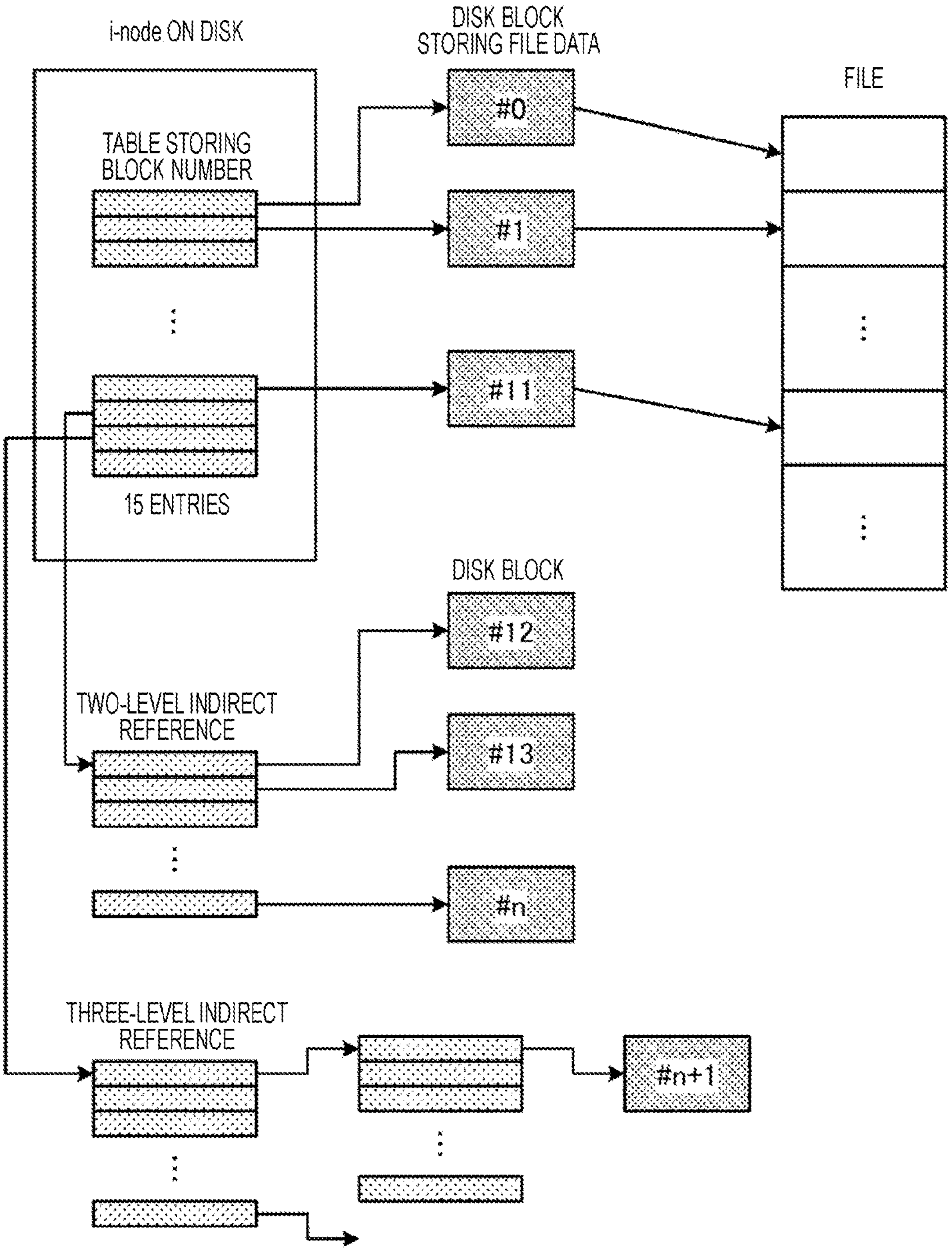
FIG. 4 is a diagram illustrating position information of a storage area of a file.

Here, the position information of the storage area of the file will be described with reference to FIG. 4. FIG. 4 is a diagram illustrating position information of the storage area of the file. A Block is a minimum unit (corresponding to a cluster in a case of a file allocation table (FAT)) for storing data used in an ext-based file system. As illustrated in FIG. 4, one file includes a plurality of Blocks and is managed by a table of an i-node. In addition, for example, when the file content is rewritten, the content is written in another block, and the correspondence relationship between the file and the Block is updated.

As described above, since the detection device 10 detects the falsification of the file using the position information (block number or the like) of the storage area of the file together with the attribute information of the file, it is possible to quickly and accurately detect the falsification of the file. In addition, as illustrated in FIG. 5, according to the result of measurement in the verification environment, the detection device 10 can significantly shorten the average detection time per file by acquiring the position information (block number or the like) and the file attribute information as compared with the digest value of the file content. That is, the acquisition of the position information and the attribute information of the file can be performed at a much higher speed than the acquisition of the digest value of the file content, and the undetectable time can be shortened.

Normally, in order to confirm whether the contents of the files in the device have been falsified, the contents of the files in the device are sequentially read and compared with the original contents to confirm whether the contents have not been changed. However, in particular, in a case where there is a large file or a large number of files, reading all the contents of the files can be strictly checked, but it takes time. The detection device 10 reads, instead of the content of the file, the position information of the storage area of the file on the file system and the file size, compares the position information and the file size with the original position information and file size, and confirms whether the file has not been changed. Here, only for a file whose position information and file size have been changed, the content of the file is read and compared with the original content, whereby the amount and frequency of reading the file content can be reduced, and falsification of the device can be quickly detected. Note that the position information and the attribute information of the file are generally very small compared to the size of the file itself, and it takes only a short time to acquire the file.

In addition, since there is a pattern in which the attribute information does not change even if the file content is falsified only with the attribute information, the detection device 10 can more correctly detect that the file has been falsified by checking not only the attribute information but also the information of the position information of the storage area of the file in combination.

Note that examples of the determination criteria are not limited to those illustrated in FIG. 2. For example, as illustrated in FIG. 6, if there is a digest value of the block number (digest value of the position information), the block number that is the position information is unnecessary. FIG. 6 is a diagram illustrating another example of the determination criterion.

[Processing Procedure of Detection Device]

Figure 7:
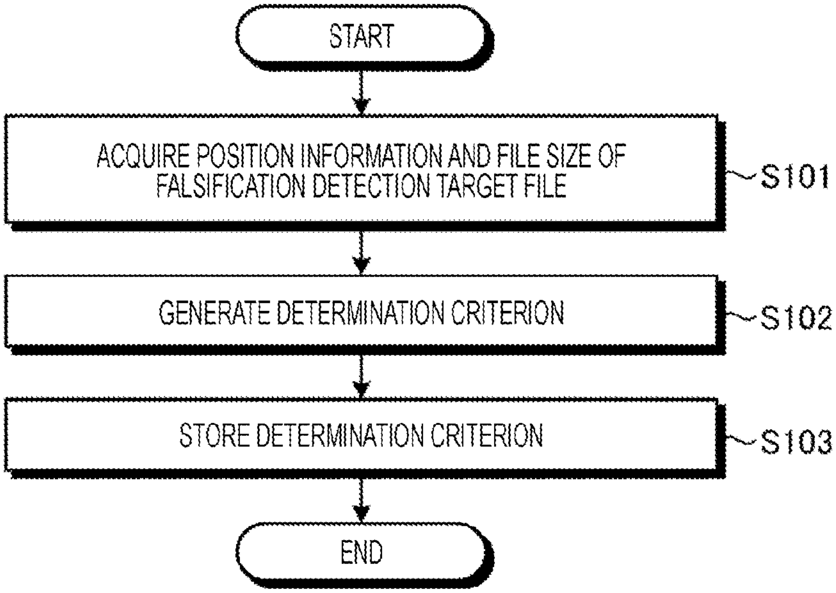
FIG. 7 is a flowchart illustrating an example of a processing procedure of pre-processing.
Figure 8:
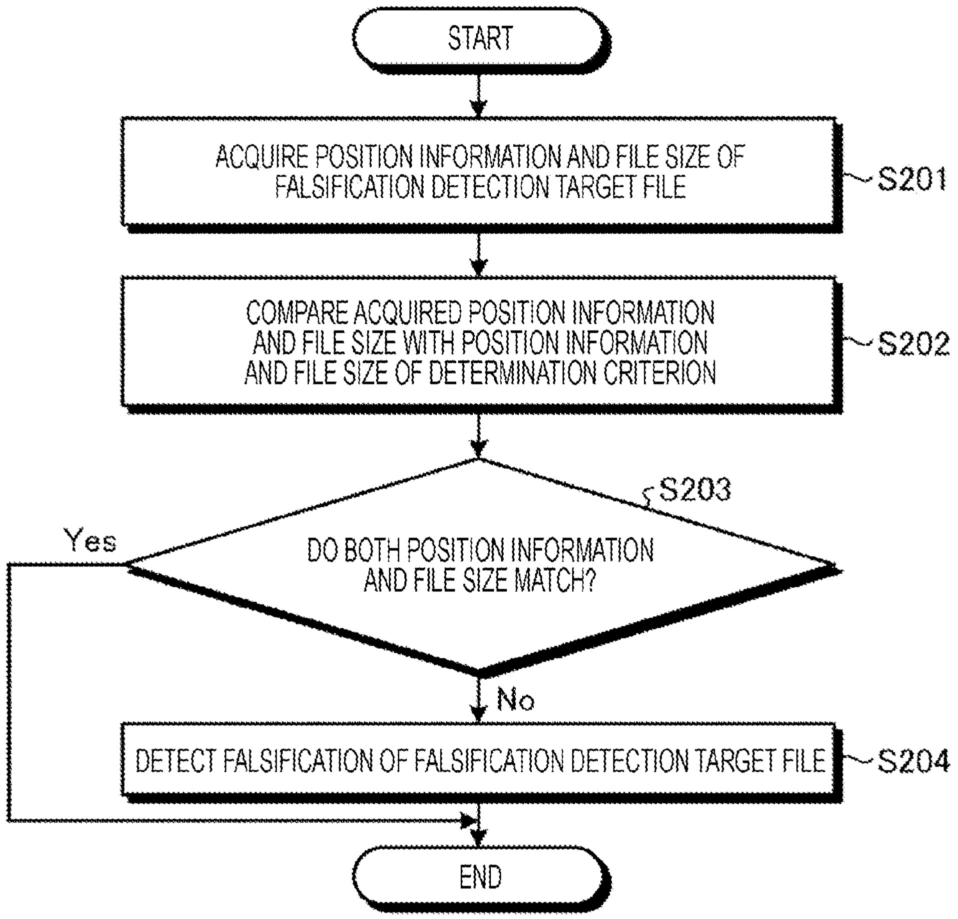
FIG. 8 is a flowchart illustrating an example of a processing procedure of detection processing.

Next, an example of a processing procedure of processing executed by the detection device 10 will be described with reference to FIGS. 7 and 8. FIG. 7 is a flowchart illustrating an example of a processing procedure of pre-processing. FIG. 8 is a flowchart illustrating an example of a processing procedure of detection processing.

First, a processing procedure of pre-processing will be described with reference to FIG. 7. As illustrated in FIG. 7, the acquisition unit 14*a* of the detection device 10 acquires the position information and the file size of the falsification detection target file (Step S101). For example, when the determination criterion is generated, the acquisition unit 14*a* acquires a set of a file path, a digest value of a file content, file position information, a digest value of position information, and file attribute information of the file for a falsification detection target file with from the target device.

The storage unit 14*b* generates a determination criterion including the position information or the file size acquired by the acquisition unit 14*a* (Step S102), and stores the determination criterion in the determination criterion memory unit 15*a* (Step S103). For example, the storage unit 14*b* generates a set of a file path, a digest value of a file content, file position information, a digest value of the position information, and file attribute information as a determination criterion, and stores the set in the determination criterion memory unit 15*a*.

Next, a processing procedure of detection processing will be described with reference to FIG. 8. As illustrated in FIG. 8, when falsification detection is performed, the acquisition unit 14*a* acquires position information and a file size of a falsification detection target file (Step S201).

Then, the detection unit 14*c* compares the position information and the file size acquired when the falsification is detected with the position information and the file size of the determination criterion saved in the determination criterion memory unit 15*a* (Step S202). As a result, the detection unit 14*c* determines whether both the position information and the file size match (Step S203).

Then, in a case where both of the position information and the file size match (Yes in Step S203), the detection unit 14*c* determines that there is no falsification, and ends the processing as it is. In addition, in a case where one or both of the position information and the file size do not match (No in Step S203), the detection unit 14*c* detects falsification of the falsification detection target file (Step S204).

Effects of Embodiment

As described above, the detection device 10 according to the embodiment acquires the position information and the file size of the falsification detection target file, determines a change in the acquired position information or file size, and detects falsification of the falsification detection target file in a case where there is a change in the position information or the file size. As a result, the detection device 10 can accurately and quickly detect falsification of a file.

That is, since the detection device 10 detects the falsification of the file using the position information (Block number or the like) of the storage area of the file together with the file size, it is possible to quickly and accurately detect the falsification of the file.

[System Configuration and the Like]

Each component of each device illustrated according to the above embodiments is functionally conceptual and does not necessarily have to be physically configured as illustrated. That is, a specific form of distribution and integration of each device is not limited to the illustrated form, and all or a part thereof can be functionally or physically distributed and integrated in any unit according to various loads, usage conditions, and the like. Furthermore, all or any part of the processing functions performed in each device can be implemented by a CPU and a program analyzed and executed by the CPU, or can be implemented as hardware by wired logic.

Furthermore, among the processing described in the above embodiments, all or a part of the processing described as being automatically performed can be manually performed, or all or a part of the processing described as being manually performed can be automatically performed by a known method. In addition, the processing procedures, the control procedures, the specific names, and the information including various data and parameters illustrated in the above document and drawings can be arbitrarily changed unless otherwise specified.

[Program]

In addition, it is also possible to create a program in which the processing executed by the detection device 10 described in the foregoing embodiment is described in a language which can be executed by a computer. In this case, the computer executes the program, and thus the effects similar to those of the above embodiments can be obtained. Furthermore, the program may be recorded in a computer-readable recording medium, and the program recorded in the recording medium may be read and executed by the computer to implement processing similar to that of the above embodiments.

Figure 9:
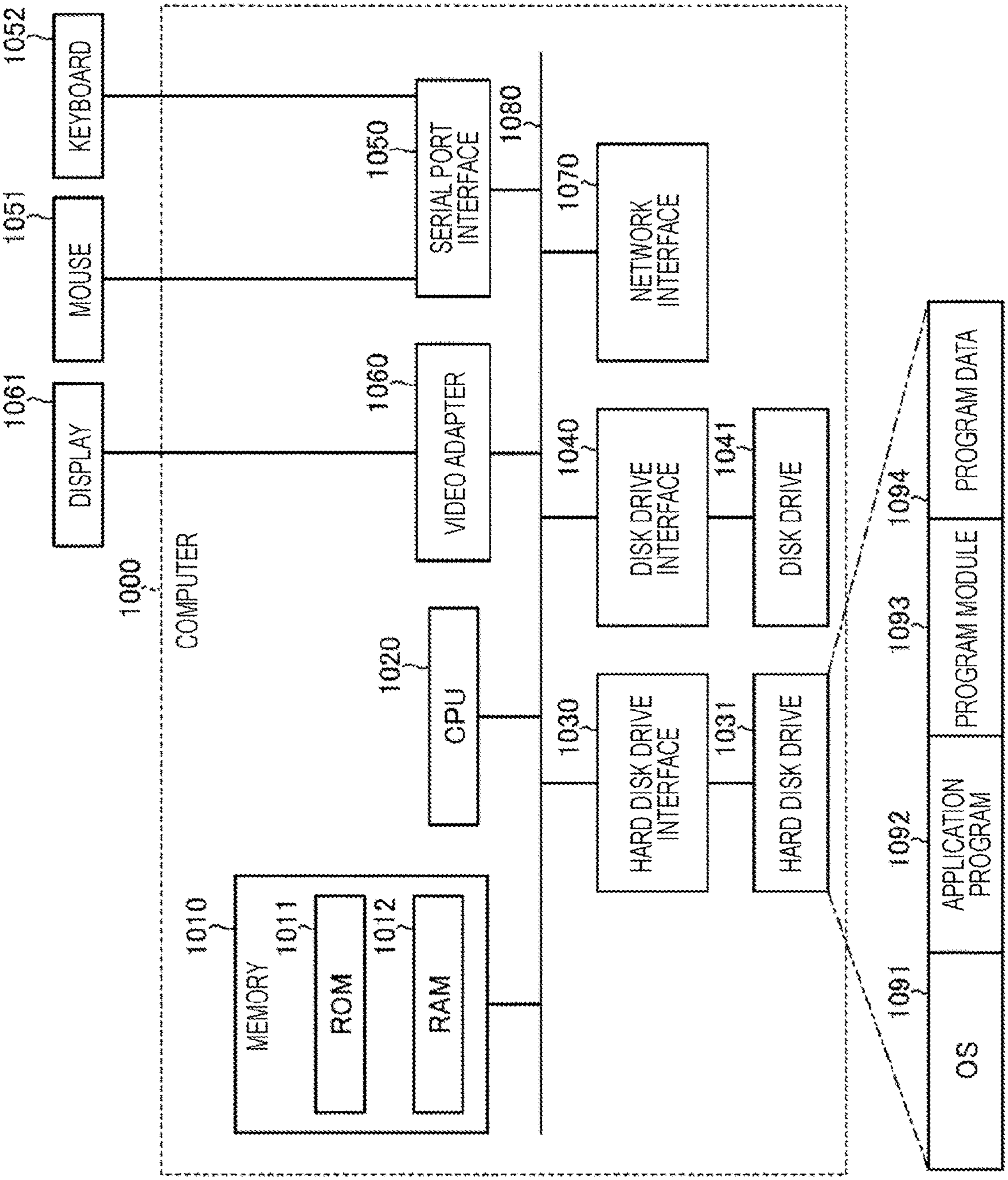
FIG. 9 is a diagram illustrating a computer that executes a program.

FIG. 9 is a diagram illustrating a computer that executes a program. As illustrated in FIG. 9, a computer 1000 includes, for example, a memory 1010, a CPU 1020, a hard disk drive interface 1030, a disk drive interface 1040, a serial port interface 1050, a video adapter 1060, and a network interface 1070, and these units are connected by a bus 1080.

As exemplified in FIG. 9, the memory 1010 includes a read only memory (ROM) 1011 and a RAM 1012. The ROM 1011 stores, for example, a boot program such as a basic input output system (BIOS). The hard disk drive interface 1030 is connected to a hard disk drive 1031 as illustrated in FIG. 9. The disk drive interface 1040 is connected to a disk drive 1041 as illustrated in FIG. 9. For example, a removable storage medium such as a magnetic disk or an optical disc is inserted into the disk drive 1041. As illustrated in FIG. 9, the serial port interface 1050 is connected to, for example, a mouse 1051 and a keyboard 1052. As illustrated in FIG. 9, the video adapter 1060 is connected to, for example, a display 1061.

Here, as illustrated in FIG. 9, the hard disk drive 1031 stores, for example, an OS 1091, an application program 1092, a program module 1093, and program data 1094. That is, the above program is stored as a program module in which a command executed by the computer 1000 is described, for example, in the hard disk drive 1031.

In addition, various data described in the above embodiments is stored as program data in, for example, the memory 1010 and the hard disk drive 1031. The CPU 1020 then reads the program module 1093 and the program data 1094 saved in the memory 1010 and the hard disk drive 1031 to the RAM 1012 as necessary, and executes various processing procedures.

Note that the program module 1093 and the program data 1094 related to the program are not limited to being stored in the hard disk drive 1031, and may be stored in, for example, a removable storage medium and read by the CPU 1020 via the disk drive or the like. Alternatively, the program module 1093 and the program data 1094 related to the program may be stored in another computer connected via a network (such as a local area network (LAN) or a wide area network (WAN)) and read by the CPU 1020 via the network interface 1070.

Although the embodiments to which the invention made by the present inventor is applied have been described above, the present invention is not limited by the description and the drawings which are parts of the disclosure of the embodiment of the present invention. In other words, other embodiments, examples, operational techniques, and the like made by those skilled in the art or the like on the basis of the present embodiment are all included in the scope of the present invention.

REFERENCE SIGNS LIST

10 Detection device
11 Communication processing unit
12 Input unit
13 Output unit
14 Control unit
**14*a*** Acquisition unit
**14*b*** Storage unit
**14*c*** Detection unit
15 Memory unit
**15*a*** Determination criterion memory unit

The invention claimed is:

1. A detection device comprising:
processing circuitry configured to:
acquire position information and a file size of a falsification detection target file, wherein the position information describes a memory block storing at least a part of the falsification detection target file;
determine a change in the position information and the file size, wherein the change in the position information comprises moving at least a part of the falsification detection target file from the memory block to another memory block; and
when there is the change in the position information, detect falsification indicating overwriting update of the falsification detection target file.

2. The detection device according to claim 1, wherein the processing circuitry is further configured to:
generate a determination criterion, the determination criterion comprises the acquired position information and a file size of the falsification detection target file, store the determination criterion,
when falsification detection is performed, subsequently acquire, as a part of performing falsification detection, another position information and another file size of the falsification detection target file, and compare the position information and the file size with said another position information and said another file size, and when the position information and said another position information do not match and the file size and said another file size do not match, detect falsification of the falsification detection target file based on assumption that there is a change in the position information or the file size.

3. The detection device according to claim 1, wherein the processing circuitry is further configured to:

acquire a digest value and a file size of position information of a falsification detection target file, and determine a change in the digest value of the position information or the file size acquired, and when there is the change in the digest value of the position information or the file size, detect falsification of the falsification detection target file.

4. The detection device according to claim 1, wherein the processing circuitry is further configured to:

when there is a change in the position information or the file size, determine whether there is a change in a digest value of a file content; and when there is a change in the digest value of the file content, detect falsification of the falsification detection target file.

5. A detection method executed by a detection device comprising:

acquiring position information and a file size of a falsification detection target file, wherein the position information describes a memory block storing at least a part of the falsification detection target file;

determining a change in the position information and the file size, wherein the change in the position information comprises moving at least a part of the falsification detection target file from the memory block to another memory block; and when there is the change in the position information, detect falsification indicating overwriting update of the falsification detection target file.

6. A non-transitory computer-readable recording medium storing therein a detection program that causes a computer to execute a process comprising:

acquiring position information and a file size of a falsification detection target file, wherein the position information describes a memory block storing at least a part of the falsification detection target file;

determining a change in the position information and the file size, wherein the change in the position information comprises moving at least a part of the falsification detection target file from the memory block to another memory block; and when there is the change in the position information, detect falsification indicating overwriting update of the falsification detection target file.

7. The detection device according to claim 1, wherein the processing circuitry is further configured to:

acquire an i-node number;

determine a change the i-node number; and when there is a change in the file size and no change in the i-node number, detect falsification indicating appending to the falsification detection target file.

8. The detection device according to claim 1, wherein the processing circuitry is further configured to:

acquire an i-node number;

determine a change the i-node number; and when there is a change in the position information and a change in the i-node number, detect falsification indicating replacement of the falsification detection target file.

9. The non-transitory computer-readable recording medium according to claim 6, the detection program further causes a computer to execute a process comprising:

acquiring an i-node number;

determining a change the i-node number; and when there is a change in the file size and no change in the i-node number, detecting falsification indicating appending to the falsification detection target file.

10. The non-transitory computer-readable recording medium according to claim 6, the detection program further causes a computer to execute a process comprising:

determining a change the i-node number; and when there is a change in the position information and a change in the i-node number, detect falsification indicating replacement of the falsification detection target file.

11. The detection method according to claim 5, further comprising: acquiring an i-node number; determining a change the i-node number; and when there is a change in the file size and no change in the i-node number, detecting falsification indicating appending to the falsification detection target file.

12. The detection method according to claim 5, further comprising: acquiring an i-node number; determining a change the i-node number; and when there is a change in the position information and a change in the i-node number, detect falsification indicating replacement of the falsification detection target file.

* * * * *